Feb. 18, 1930.  K. LANNINGER  1,747,942
PIPE LINE
Filed Oct. 8, 1923
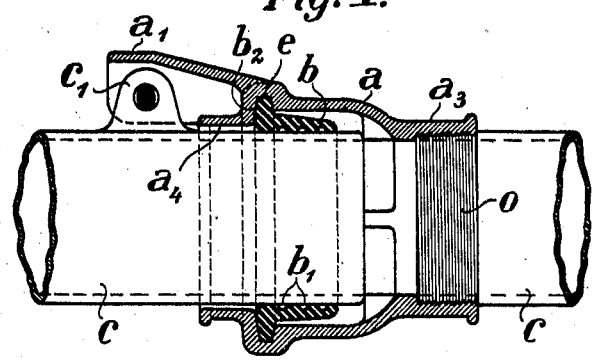
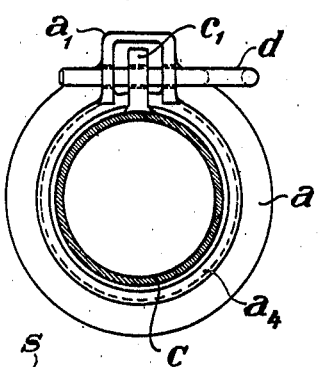
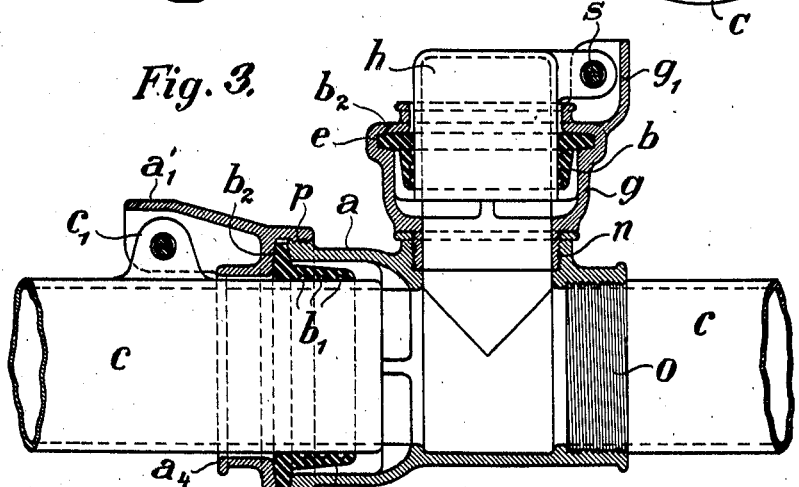
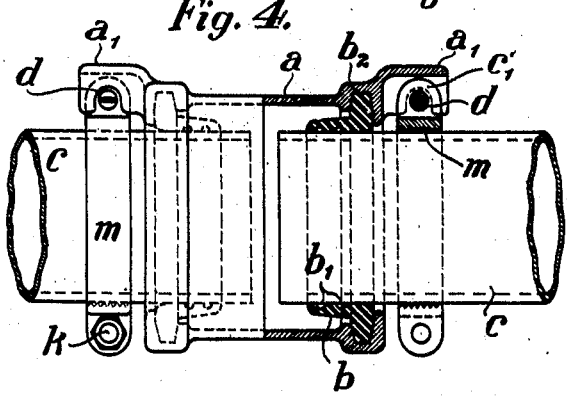
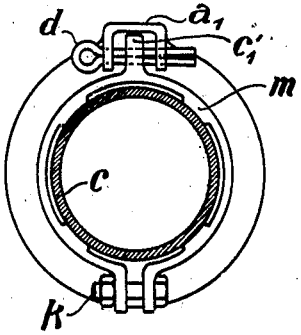
Inventor
K. Lanninger Patented Feb. 18, 1930

1,747,942

UNITED STATES PATENT OFFICE

KARL LANNINGER, OF FRANKFORT-ON-THE-MAIN, GERMANY

PIPE LINE

Application filed October 8, 1923, Serial No. 667,353, and in Germany October 14, 1922.

This invention relates to a line of conduits especially designed for conducting water or steam and in the first mentioned case especially for showering, irrigating and fire extinguishing purposes. The line consists of pipes which are held together by means of sleeve-like coupling casings with rubber packing cups.

The salient feature of the invention consists in that the coupling sleeves are rigid and have cups of elastic material the neck of each cup fitting tightly on the corresponding pipe end, said cups having further each a flange which is clamped in the casing. Only for the reason that they are rigid the coupling casings are capable to withstand the rough handling to which they are submitted, as the pipe lines are thrown about on the fields and in factories. On account of the rigidity of the coupling casing it is however very difficulty to ensure the lightness of the joint between the cup and the casing. According to the invention this difficulty is overcome by using the elastic packings through which not only is a tight joint capable of being maintained but a certain degree of flexibility is imparted to the pipe line. The very strong vertical flange on the packing cup permits of a specially simple fixation as it is inserted and clamped in a groove of the coupling sleeve.

The invention will be best understood from a consideration of the following detailed description taken in connection with the accompanying drawing forming a part of this specification, with the understanding that while on the drawings several embodiments of the invention are disclosed, the invention is not confined to any strict conformity with the showing of the drawings, but may be embodied in any manner which does not make a material departure from the salient features of the invention.

In the drawings:—

Fig. 1 shows the coupling casing in longitudinal section.

Fig. 2 is an end view of the casing shown from the left of Fig. 1.

Fig. 3 shows in longitudinal section the coupling of a branch pipe.

Figs. 4 and 5 show in longitudinal section and in end view respectively another form of construction of the pipe coupling.

According to Figs. 1 to 3 the coupling sleeve $a$ has an internally threaded cylindrical neck $a^3$ screwed upon the threaded end $o$ of a pipe $c$. The other neck $a_4$ of the coupling sleeve is also cylindrical but smooth so that the end of the other pipe $c$ can be inserted through this neck $a_4$ and through the hat shaped rubber packing $b$. The flange $b_2$ of the packing is held in a recess $e$. In order to facilitate the tight fitting of the rubber cup on the pipe wall grooves $b_1$ are arranged in the cylindrical part of the same. The sleeve $a$ is connected with this second pipe by means of a hinge. An eye $c_1$ of pipe $c$ projects with sufficient play into a lug $a_1$ of the sleeve $a$ and is connected with the same by a loosely inserted cotter pin $d$. The easy movement of the hinge $c_1$, $a_1$ and the ample play of the cotter pin in the borings of the hinge further increase the flexibility of the joint of the pipes and the facility of this joint to adapt itself to the irregularities of the ground and the available space.

The couplings could also serve for branch pipes as shown in Fig. 3. In this case the casing or sleeve $a$ of the pipe coupling has a branch $g$, $g_1$ and a cap $h$ mounted in the branch $g_1$ by means of a hinge $s$. The branch $g$ may be either made in one piece with the sleeve $a$ or, as shown in Fig. 3, it may be removably connected with the said sleeve $a$ by threaded sleeve $n$.

The packing $b$ could be adjustably mounted in the casing $a$ as shown in Fig. 3. In this case the sleeve and neck are composed of two parts $a$, $a'_1$ between the adjacent threaded ends $p$ of which the flange $b_2$ of the cup shaped packing is clamped.

Figs. 4 and 5 show that the rough pipe ends may be connected, in which case a split ring $m$ is fixed on the pipe $c$ with the aid of a screw $k$, said ring having an extension $c'_1$ which is hingedly connected with the extension $a_1$ by a cotter pin $d$.

I claim:—

1. A pipe joint comprising in combination with pipes, a rigid coupling sleeve for coupling the pipe ends, said rigid sleeve including a separate neck part larger in outward direction than the pipe which it is to encompass, an elastic packing in said sleeve consisting of a cylindrical part tightly fitting around the pipe end which said neck part surrounds, and of a flange, the latter fitting within a groove formed between said sleeve and neck part, said neck part screwing relative to said sleeve for securing said neck part in place and for clamping the flange of the packing between said sleeve and neck part, and a split ring adapted clampably engaging said pipe for securely attaching said pipe swively to said neck part.

2. A pipe joint in combination with pipes one of which has an unthreaded end, a rigid sleeve for coupling the pipes into which sleeve said unthreaded end extends, a cup-shaped packing of elastic material in said coupling sleeve on the side adjacent the unthreaded pipe end, having a free portion extending into said sleeve, and a flange, said flange tightly enclosing said pipe end, said sleeve including means for clamping the flange of said cup-shaped packing in said sleeve, and means for hingedly securing said sleeve to the pipe having the unthreaded end.

3. A pipe joint in connection with pipes one of which has an unthreaded end, a rigid coupling sleeve for coupling said pipes into which said unthreaded end extends, said sleeve having an interior annular groove in the inner surface, a packing of elastic material in said coupling sleeve consisting of a free cylindrical part frictionally enclosing the unthreaded pipe end and having a flange frictionally retained in the groove of said sleeve, and means for hingedly securing said sleeve on the pipe having the unthreaded end.

4. A pipe joint in combination with pipes one of which has an unthreaded end, a rigid coupling sleeve for coupling said pipes, a cup-shaped packing of elastic material in said coupling sleeve and frictionally enclosing the unthreaded pipe end, a flange on said cup-shaped packing clamped in said sleeve, and means for hingedly securing said sleeve on the pipe having the unthreaded end, including a split clamping ring on said pipe, a projection on said sleeve, a projection on said ring, and a cotter pin connecting the projections on said ring and sleeve.

5. A pipe joint in connection with pipes one of which has an unthreaded end, a rigid coupling sleeve for coupling said pipes, said sleeve being formed with a groove in its inner surface, a packing of elastic material in said sleeve, said packing including a cylindrical member frictionally enclosing the unthreaded pipe end, and a flange clamped in the groove of said sleeve, means hingedly securing said sleeve on the pipe having the unthreaded end, said means including a split clamping ring on the said pipe, a projection on said ring, a projection on said sleeve, and a cotter pin connecting said projection on the ring with said projection on the sleeve.

6. A pipe joint in combination with pipes one of which has an unthreaded end, a rigid coupling sleeve for coupling said pipes, said sleeve consisting of a cylindrical part secured to one pipe end, and a curved neck part enlarged in an outward direction and surrounding the unthreaded pipe end, an elastic packing in said sleeve consisting of a cylindrical part frictionally fitting around the pipe having the unthreaded end which is surrounded by said neck, and of a flange, means for securing the neck to the sleeve in clamping relation to the flange of said packing, and means for hingedly attaching said sleeve to the pipe having the unthreaded end comprising a split clamping ring on said pipe, a projection on said ring, a projection on said sleeve, and a cotter pin for connecting said projections.

In testimony whereof I affix my signature.

KARL LANNINGER.